United States Patent [19]

Crankshaw et al.

[11] 4,210,484

[45] Jul. 1, 1980

[54] LABEL SPREADER APPLICATOR

[75] Inventors: Michael Crankshaw, Santa Fe Springs; Leo Kucheck, Irvine, both of Calif.

[73] Assignee: Label-Aire Inc., Fullerton, Calif.

[21] Appl. No.: 930,722

[22] Filed: Aug. 3, 1978

[51] Int. Cl.[2] .............................................. B32B 31/00

[52] U.S. Cl. .................................... 156/542; 156/557; 156/566

[58] Field of Search ............... 156/540, 541, 542, 557, 156/559, 560, 561, 562, 566, 567, 568, 247, 249, 285, 361, 363, 364, DIG. 33, DIG. 37

[56] References Cited

U.S. PATENT DOCUMENTS

| | | | |
|---|---|---|---|
| 3,891,492 | 6/1975 | Watson | 156/566 |
| 4,024,011 | 5/1977 | Crankshaw et al. | 156/562 |
| 4,046,613 | 9/1977 | Kucheck et al. | 156/285 |

*Primary Examiner*—David A. Simmons
*Assistant Examiner*—William H. Thrower
*Attorney, Agent, or Firm*—Gordon L. Peterson

[57] ABSTRACT

The label applicator disclosed herein is adapted for use with labels which are provided in a plurality of rows extending longitudinally on the backing strip. The label applicator comprises a label dispenser for peeling the labels from the backing strip with the labels moving in a first direction off of the backing strip to provide at least first and second labels at a label dispensing station. A label separator receives the first and second labels and separates them in a direction generally transverse to the first direction to increase the distance between the first and second labels. The separated labels are then transferred to at least one article.

19 Claims, 8 Drawing Figures

3
45
11
17
47
49
53
38
31
43
35
41
43
29
CONTROLS
19
23
57
39
2
2
25
21
27
A
15
37
23
13
55
39
59
61
3

39
25
27
37
31
21
33
37

LABEL SPREADER APPLICATOR

BACKGROUND OF THE INVENTION

In a conventional labeling operation, articles to be labeled are conveyed single file through a labeling station. A label applicator at the labeling station applies a label to each article as such article passes through the labeling station.

There are instances in which it is desirable to label articles which are arranged in side-by-side relationship on a conveyor. For example, some packaging equipment provides an output which includes side-by-side packages.

One way to label side-by-side articles is to employ a vary wide backing strip carrying substantially spaced apart rows of labels extending longitudinally of the backing strip and a very wide peeling bar to remove the side-by-side labels from the backing strip. However, the wide backing strip wastes a large amount of paper, especially when the labels are relatively small and the articles to be labeled are relatively large and/or widely spaced.

One solution to this problem is described in common assignee's U.S. Pat. No. 4,046,613. This patent discloses a label applicator which is adapted for use with labels arranged in a conventional manner in a single row on a backing strip. A multiple number of these labels are sequentially removed from the backing strip with such labels moving in a first direction, and then the removed labels are spread in that same direction. The labels are spread appropriately so that one can be applied to each of the side-by-side articles, or in the case of a large single article, the labels are spaced appropriately for application to such article.

SUMMARY OF THE INVENTION

The apparatus of U.S. Pat. No. 4,046,613 functions very satisfactorily, particularly with a single row of labels on the backing strip. The present invention provides a label spreader applicator which is particularly adapted for using labels which are provided in a plurality of rows extending longitudinally on the backing strip. Although multiple rows of labels are provided, the backing strip is relatively narrow and is only slightly wider than the combined width of the rows of labels. Accordingly, paper is not wasted.

Label dispensing means peels the labels from the backing strip with the labels moving in a first direction off of the backing strip to provide at least first and second labels at a dispensing station. The multiple rows of labels on the backing strip can be contiguous or only narrowly spaced because the present invention provides for separating these labels after they have been removed from the backing strip. To accomplish this, label separating means receives from the label dispensing means at the label dispensing station the first and second labels which have been peeled from the backing strip and separates these labels. With this invention, label separation takes place in a direction generally transverse to the first direction, i.e., the direction of movement of the labels when they are removed from the backing strip to thereby increase the distance between the labels. Preferably, the label separating means separates the labels in a direction transverse to the first direction and generally in the plane of the removed labels. Viewed from another perspective, the labels are spread in the direction of the width dimension of the backing strip at the location where the labels are removed from the backing strip. Transferring means transfers the separated first and second labels to the same or different articles.

Label separation can take place as a result of virtually any kind of relative movement between the labels in the appropriate direction. For example, in the case of two labels, either or both of the labels may be moved relative to fixed supporting structure to bring about the desired label separation. The labels can be separated by moving them along either linear or arcuate paths.

If desired, the labels can be both spread and moved in another direction for various purposes, such as moving the labels closer to the articles to which they are to be applied. Alternatively, the labels can be spread only in which event the label applying station to which the labels are spread may be in substantially the same plane as the label dispensing station.

One advantageous way of carrying out the label spreading function is to provide first and second label receivers mounted on a supporting structure for relative movement between first and second positions. Because relative movement between the two label receivers is required, either or both of the label receivers can be moved relative to fixed supporting structure. Each of the label receivers includes means for releasably retaining the labels supplied to such label receiver. Accordingly, movement of the label receivers can be carried out with the labels releasably retained thereon.

In a preferred practice of the invention, the first and second positions are at the label dispensing station and the label applying station, respectively. Thus, the label receivers are relatively close together at the label dispensing station so that they can receive the labels from a label dispenser and are farther apart in the second position so that labels can be transferred to the articles. If both of the label receivers move, the paths along which they move can be parallel or divergent as the paths extend from the first position toward the second position.

In one form of the invention, the label receivers are mounted on a carriage, and the carriage is in turn mounted on supporting structure for movement along a first path. Either or both of the label receivers are mounted on the carriage for movement relative to the carriage and relative to the other label receiver. The label receivers can be advantageously moved relative to the carriage as a function of the position of the carriage along the above-mentioned first path.

The carriage can move linearly, in which event, it preferably reciprocates. Alternatively, the carriage may be mounted for rotation.

The invention, together with further features and advantages thereof, may best be understood by reference to the following description taken in connection with the accompanying illustrative drawing.

DESCRIPTION OF THE PREFERRED EMBODIMENTS

Figures 1, 2:
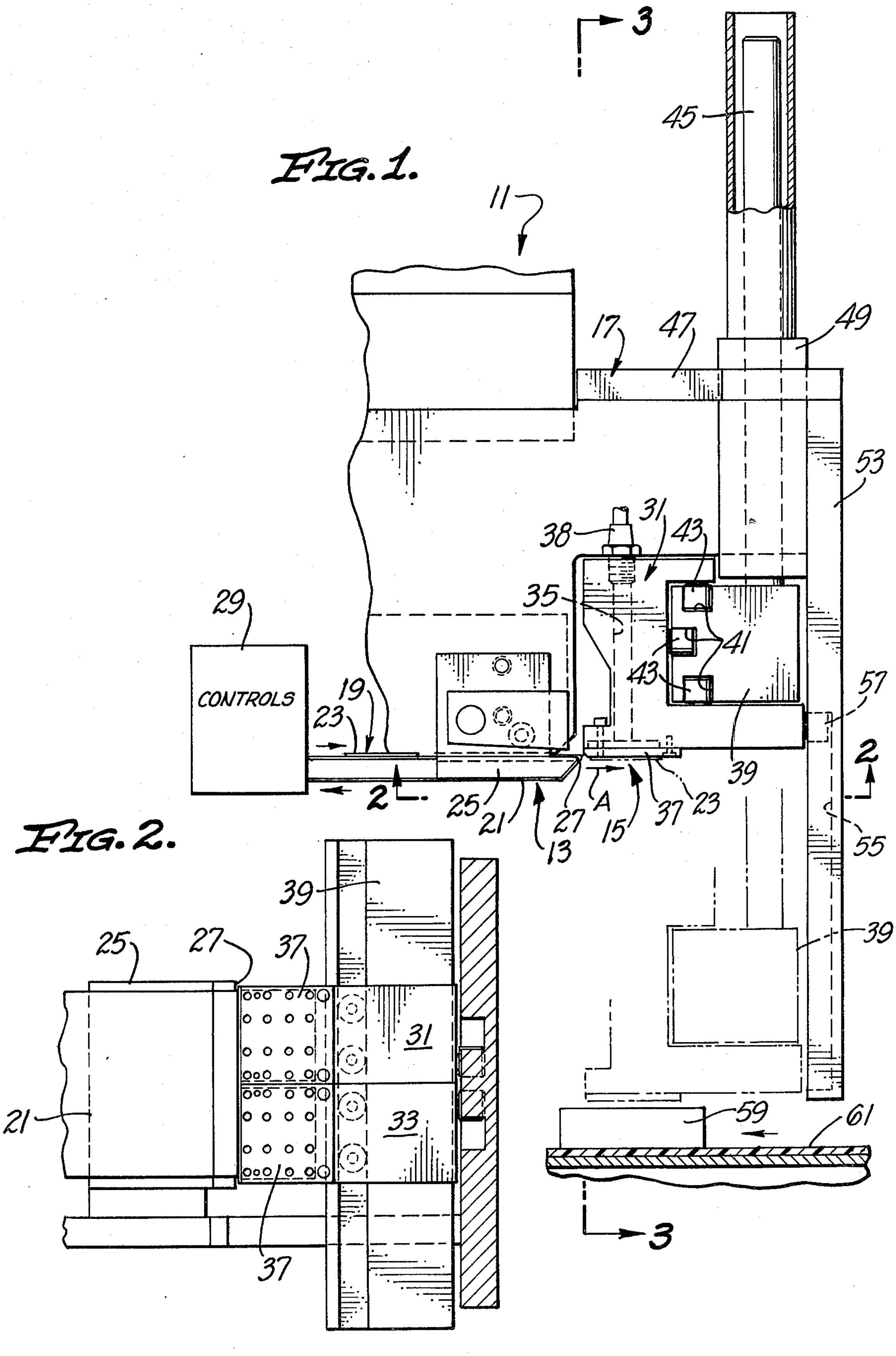
FIG. 1 is a fragmentary elevational view partially in section of one form of label applicator constructed in accordance with the teachings of this invention with the label receivers being at the label dispensing station. The position of the components of the label applicator at the label applying station are illustrated in phantom lines.
FIG. 2 is a sectional view taken generally along line 2—2 of FIG. 1.
Figure 3:
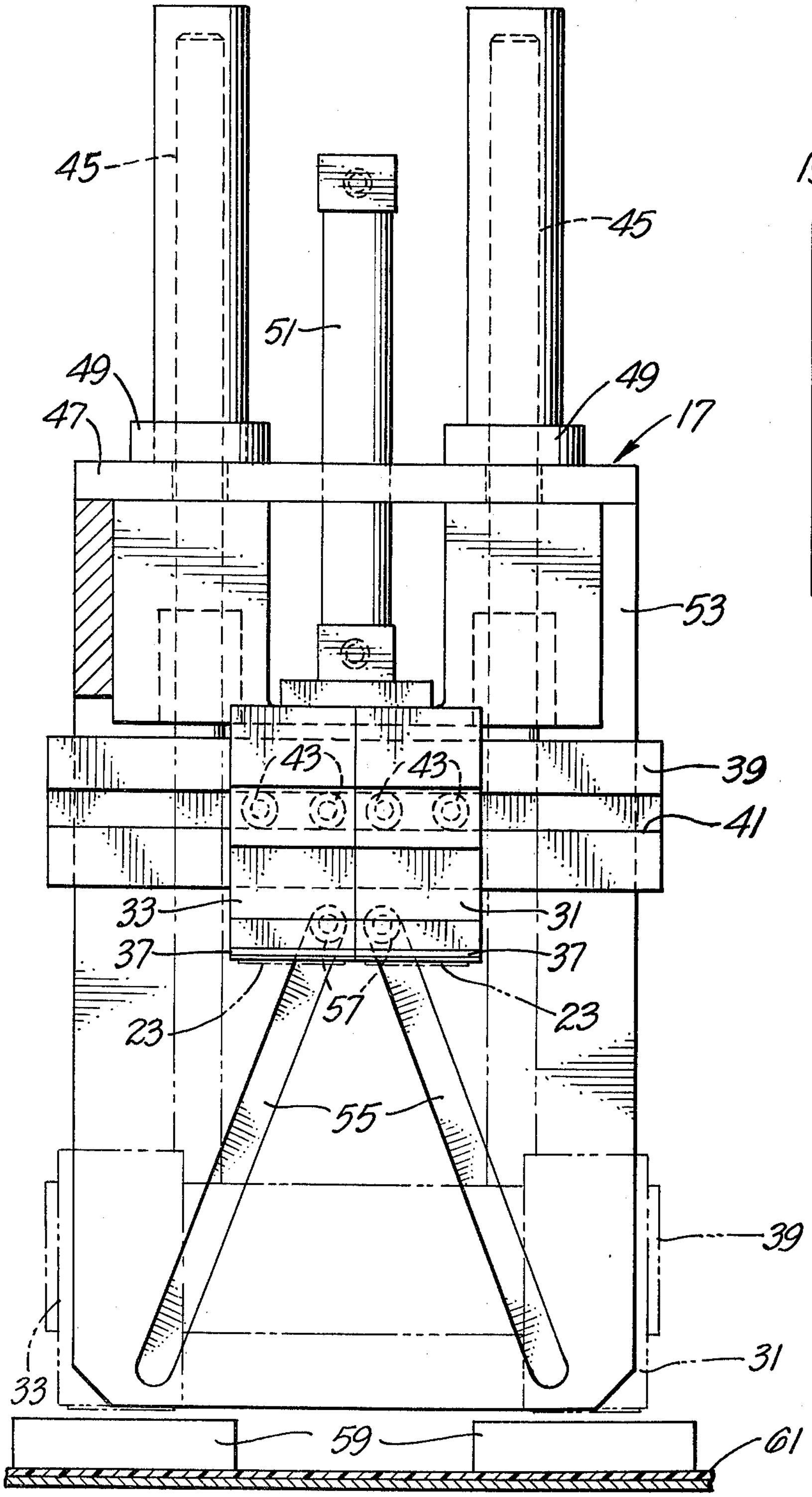
FIG. 3 is an elevational view taken generally along line 3—3 of FIG. 1.

FIGS. 1-3 show a label applicator 11 which includes label dispensing means 13, label separating means 15 and a supporting structure 17 on which the various components of the label applicator are mounted. The label applicator 11 is particularly adapted for use with a label strip 19 (FIG. 4) which includes a web or backing strip 21 of a suitable release paper and pressure sensitive adhesive labels 23 releasably adhered to one side of the backing strip. The backing strip 21 is elongated, and the labels 23 are provided in multiple, parallel rows which extend longitudinally of the backing strip. The rows of labels 23 may be contiguous or very narrowly spaced so that the width of the backing strip 21 is just sufficient to accommodate the side-by-side rows of labels 23. In the construction shown in FIG. 4, two rows of the labels 23 are provided. Of course, any suitable, desired number of rows of labels 23 may be provided on the backing strip 21.

The label dispensing means 13 may be of any suitable construction which will remove the labels 23 from the backing strip 21 and provide them to the label separating means 15. Label dispensing means of this type are known and one such label dispensing means is disclosed in common assignee's U.S. Pat. No. 4,046,613 referred to hereinabove.

Figure 4:
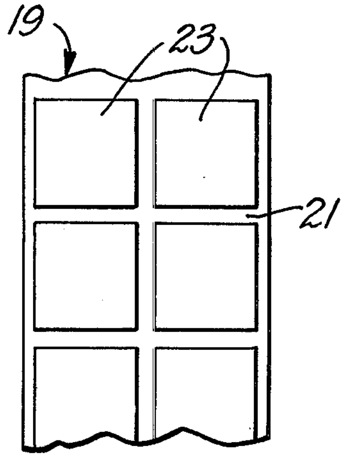
FIG. 4 is a fragmentary plan view of a label strip of the type which is adapted for use with the label applicator of this invention.

The label dispensing means 13 includes a peeling bar 25 suitably affixed to the supporting structure 17. The peeling bar 25 has a peeling edge 27 over which the label strip 19 extends. The label dispensing means 13 includes conventional controls 29 which sequentially move the label strip 19 in a well-known manner over the peeling edge 27 to sequentially remove the labels 23. With each indexing movement of the label strip 19, one label 23 from each of the two rows of labels shown in FIG. 4 is removed from the backing strip 21 with the labels being removed from the backing strip in a direction transverse to the peeling edge 27 and in the direction of the arrow A in FIG. 1.

The label separating means 15 includes two identical label receivers 31 and 33 for receiving the removed labels from each of the two rows of labels, respectively. The use of two label receivers 31 and 33 is purely illustrative because generally the number of label receivers should correspond with the number of labels or groups of labels that are to be spread apart. Because the label receivers 31 and 33 are identical, only the label receiver 31 is described in detail, and corresponding portions of the label receiver 33 are designated by corresponding reference numerals.

The label receiver 31 is much like the conventional vacuum box used in prior art label applicators in that it includes a cavity 35 (FIG. 1) and an air pervious apertured grid 37 for receiving one of the labels 23. The grid 37 lies closely adjacent the peeling edge 27 of the peeling bar 25 (FIGS. 1 and 2) and generally in the plane of movement of the labels 23 off of the backing strip 21 so that it can receive one of the labels 23 as such label is removed from the backing strip 21 by the label dispensing means 13. The cavity 35 is evacuated to a suitable sub-atmospheric pressure via a fitting 38 (FIG. 1) to releasably retain the removed label 23 against the outer face of the grid 37 in a conventional manner, and an air blast is also provided through that fitting to remove the labels from the grid.

In the position shown in full lines in FIGS. 1-3, the label receivers 31 and 33 are in abutting relationship at the label dispensing station. The label receivers 31 and 33 are mounted for movement to spread the labels 23 generally in the direction of the width dimension of the backing strip 21 at the label dispensing station, i.e., generally in the direction which the peeling edge 27 extends. Viewed from another perspective, the label receivers 31 and 33 spread the labels in a direction generally transverse to the direction in which the labels move when they are peeled from the backing strip 21. In addition, the label receivers 31 and 33 in this form of the invention also move the labels 23 perpendicular to the peeling edge 27, i.e., downwardly as viewed in FIG. 1. This latter movement does not spread the labels, but illustrates that the label applicator 11 is adaptable to labeling requirements where the labels must be "snorkled" or moved into a predetermined location remote from the peeling bar for application of articles.

To provide for the spreading movement of the label receivers 31 and 33, each of them is mounted on a carriage 39 for relative movement toward and away from each other. Specifically, the carriage 39 has three parallel grooves or tracks 41 extending parallel to the peeling edge 27, and each of the label receivers 31 and 33 has rollers 43 which are received in the tracks 41. In this manner, both of the label receivers 31 and 33 can be moved parallel to the peeling edge 27, although for label spreading purposes, it is only necessary that one of the label receivers be movable relative to the carriage 39, and the other label receiver could be fixed relative to the carriage 39, if desired.

To provide for movement of the label receivers 31 and 33 perpendicular to the peeling edge 27 and to the plane of the labels 23 on the grid 37, the carriage 39 is mounted on rods 45 (FIGS. 1 and 3) for vertical movement along a carriage path with the rods relative to the supporting structure 17. Although the rods 45 can be mounted in different ways, in the embodiment illustrated, each of them is mounted for vertical reciprocating movement on a brace 47 of the supporting structure 17 by a bearing 49. A linear actuator 51 in the form of a pneumatic cylinder (FIG. 3) is mounted on the supporting structure 17 and coupled to a central region of the carriage 39 to reciprocate the carriage along the carriage path between the label dispensing station shown in full lines in FIGS. 1 and 3 and a label applying station shown in phantom lines in FIGS. 1 and 3.

Although the label receivers 31 and 33 can be spread apart along the carriage 39 in different ways, in the embodiment illustrated, cam means are used for moving the label receivers along the carriage 39 as a function of the position of the carriage along the carriage path. To accomplish this, a cam plate 53 having two cam tracks 55 therein is fixedly mounted on the brace 47. Each of the label receivers 31 and 33 has a cam follower 57 in the form of a roller received in an associated one of the cam tracks 55.

Although the cam tracks 55 could be of different configurations, in the embodiment illustrated, they are linear and they diverge (FIG. 3) as they extend from the label dispensing station toward the label applying station. Thus, as the carriage 39 is moved downwardly, the cam followers 57 cooperate with the cam tracks 55 to cam the label receivers 31 and 33 apart to spread the labels carried by the label receivers. The amount which the label receivers 31 and 33 space the labels 23 will be different for different applications, but in any event, the spacing between labels when they are applied to the articles 59 is greater than the spacing between adjacent rows of labels when the labels are on the backing strip 21.

The label applicator 11 is adapted to apply labels to two articles 59 or to apply two labels to a single article with the labels being in predetermined spaced relationship on such article. In the embodiment illustrated, in articles 59 are conveyed through the label applying station in two side-by-side rows as illustrated in FIGS. 1 and 3 in a direction transverse to the peeling edge 27.

In use, labels 23 are releasably retained on the grids 37 at the label dispensing station. The presence of the articles 59 at or near the labeling station is sensed by a photocell or other conventional means, and a suitable signal is provided to automatically extend the actuator 51 to urge the carriage 39 vertically downwardly. Downward movement of the cam followers 57 in the cam tracks 55 cams the label receivers 31 and 33 away from each other to the position shown in phantom lines in FIG. 3. When the carriage 39 is fully extended, the articles 59 are also at the label applying station directly beneath the label receivers 31 and 33, respectively, and the labels are then transferred to the associated article in a conventional manner, such as a blast of air under pressure supplied through the fitting 38, cavity 35, and the openings of the grids 37. Alternatively, the labels 23 can be tamped on the articles 59, respectively. Following the air blast, the actuator 51 is automatically retracted to return the carriage 39 and the label receivers 31 and 33 to the label dispensing station. Following this, the controls 29 automatically advance the label strip 19 sufficiently to remove one of the labels 23 from each of the two rows of labels and apply such removed labels to the grids 37 of the label receivers 31 and 33. Of course, the functions of the label applicator 11 could be programmed in other ways.

Figure 5:
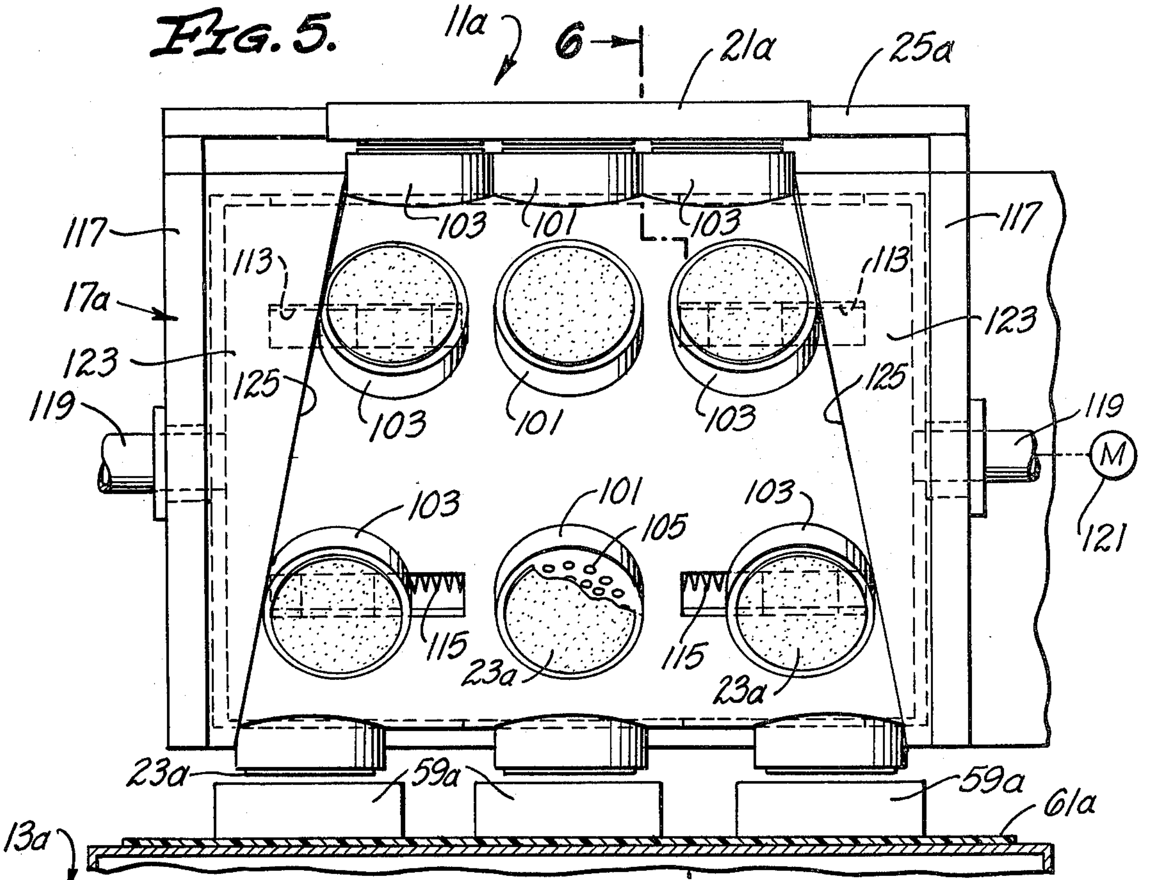
FIG. 5 is a front elevational view of a second form of label applicator constructed in accordance with the teachings of this invention.
Figure 6:
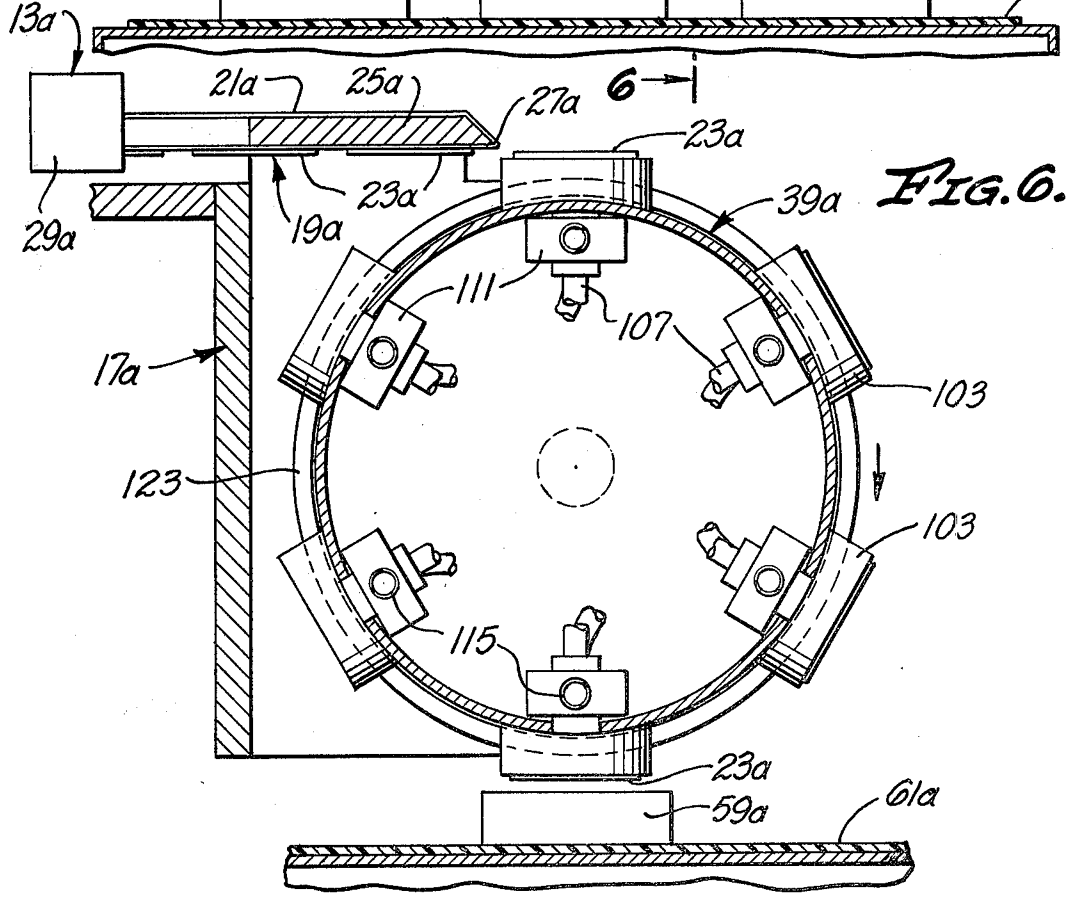
FIG. 6 is a sectional view taken generally along line 6—6 of FIG. 5.

FIGS. 5 and 6 show a label applicator 11*a* which carries out the same label spreading and label movement functions carried out by the label applicator 11. Portions of the label applicator 11*a* corresponding to portions of the label applicator 11 are designated by the letter "a."

One major difference between the label applicators 11 and 11*a* is that the carriage 39*a* of the latter is mounted on the supporting structure 17*a* for rotational movement about a rotational axis. In addition, the label applicator 11*a* includes a plurality of sets of label receivers with each such set including a central label receiver 101 and two identical outside label receivers 103. Functionally, this enables the label receivers 101 and 103 to be rotated from the label dispensing station adjacent the peeling bar 25*a* to a label applying station adjacent the articles 59*a* so that labeling can be carried out during the return movement of the label receivers from the label applying station to the label dispensing station. In other words, the label applicator 11*a* is faster than the label applicator 11.

More specifically, the label dispensing means 13*a* can be identical to the label dispensing means 13, and the label strip 19*a* may be identical to the label strip 19, except that three longitudinally extending rows of labels 23*a* are provided on the backing strip 21*a*.

Although the rotatable carriage 39*a* may take different forms, in the embodiment illustrated, the carriage 39*a* is in the form of a cylindrical, rotatable drum mounted for rotation about a rotational axis which is parallel to the peeling edge 27*a*. The label receivers 101 and 103 are identical and each of them includes a grid 105 and a hollow interior to which air under greater than atmospheric pressure can be supplied by way of fittings 107. Thus, the label receivers 101 and 103 are in the form of vacuum boxes having an air blast capability for label transfer purposes.

The label receivers 101 and 103 of each set are arranged on the carriage in a row extending axially of the carriage, and the sets are equally spaced circumferentially. The label receivers 101 are suitably fixedly mounted on the wall of the carriage 39*a*, and the label receivers 103 are mounted on the carriage 39*a* for movement axially of the carriage toward and away from the associated intermediate label receiver 101. In the embodiment illustrated, a section 111 of each of the label receivers 101 and 103 lies inside the carriage 39*a* and is releasably attached to the external portion of the associated label receiver as by screw threads (not shown) to thereby mount the label receiver on the carriage. The central label receivers 101 are tightly clamped to the carriage 39*a* so as to be immovable relative to the carriage. However, the label receivers 103 extend through axial slots 113 in the wall of the carriage 39*a* and, by virtue of the cooperation between the slots and the internal and external portions of the label receiver, they are mounted for movement axially of the carriage 39*a* toward and away from the associated central label receiver 101.

Springs 115 act between each of the outside label receivers 103 and the associated central label receiver 101 to urge the outside label receivers 103 axially outwardly in their associated slots 113. The springs 115 are appropriately countersunk in the label receivers 101 and 103 to permit the label receivers to be very close together at the label dispensing station as shown in FIG. 5.

The supporting structure 17*a* is appropriately modified to mount the carriage 39*a* for rotation. Thus, the supporting structure 17*a* includes mounting plates 117 and the carriage includes shafts 119 at its opposite ends received in bearings in the plates 117. In this manner, the carriage 39*a* is mounted for rotational movement about a rotational axis which coincides with its geometric axis. The carriage 39*a* can be rotated in various different ways, such as by a stepping motor 121.

A pair of cams 123 are fixedly mounted on the plates 117, respectively, for controlling the spreading motion of the label receivers 103 as a function of the angular position of the carriage 39*a*. Each of the cams 123 is in the form of a shell into which one end portion of the carriage 39*a* is rotatably received. Each of the cams 123 has an inclined cam surface 125 against which the outside label receivers 103 are urged by the springs 115. The cam surfaces 125 diverge as they extend from the label dispensing station to the label applying station.

The label applicator 11*a* can be controlled in different ways to spread and apply labels to the articles 59*a*. For example, with the carriage 39*a* in the position shown in FIGS. 5 and 6 and with labels 23*a* on all of the label receivers 101 and 103 from the twelve o'clock position, i.e., at the label dispensing station, clockwise through the six o'clock position, i.e., at the label applying station, as viewed in FIG. 6, the label receivers at the six o'clock position can apply labels to the three articles 59*a* immediately therebelow. This can be brought about by product sensors which sense the presence of the articles 59*a* at the labeling station and cause the application of a blast of air through the fittings 107 to the label receivers 101 and 103 at the label applying station. After the labels 23 have been blown from these label receivers, the stepping motor 121 is energized to index the carriage 39*a* and the label receivers 101 and 103 one increment clockwise as viewed in FIG. 6 to bring the next set of label receivers having labels thereon to the label applying station and to bring the next set of label receivers without labels thereon to the label dispensing station. When the indexing movement is complete, the label dispensing means 13 is automatically energized to remove three additional labels from the backing strip 21 and to apply them to the label receivers 101 and 103 at the label dispensing station as described in the embodiment of FIGS. 1–3. Thereafter, the process described above is repeated. Of course, the label applying station and the label dispensing station can be at positions other than six o'clock and twelve o'clock, respectively.

Figure 7:
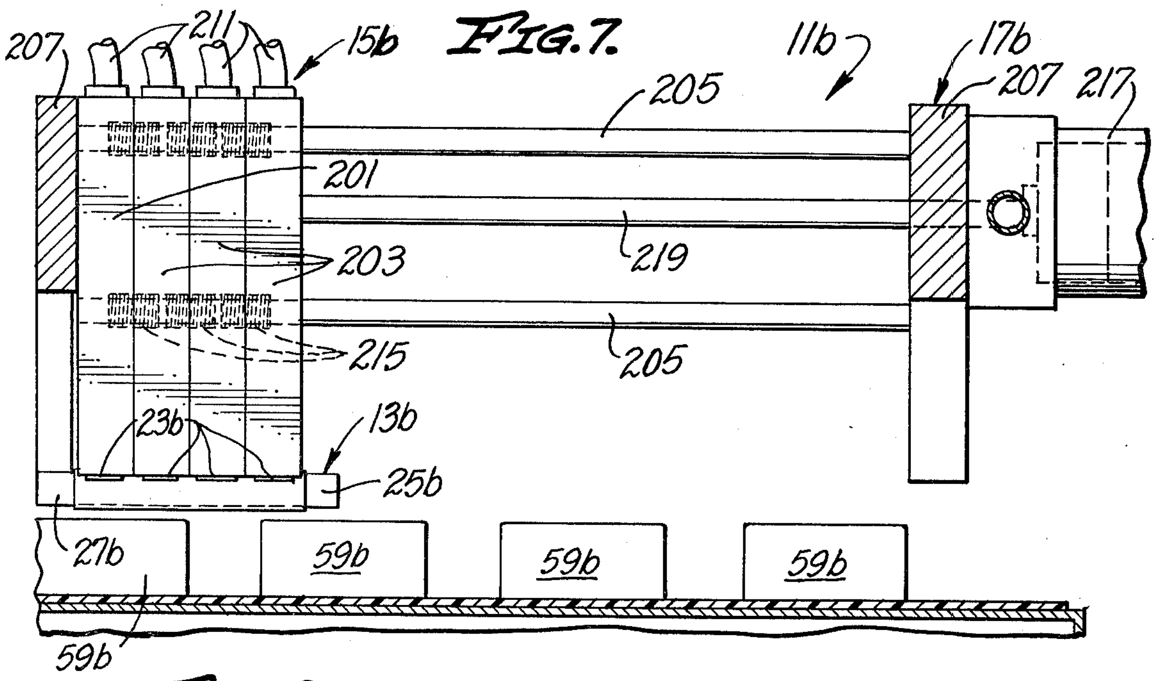
FIG. 7 is a front elevational view partially in section of a third form of label applicator constructed in accordance with the teachings of this invention with the label receivers at the label dispensing station.
Figure 8:
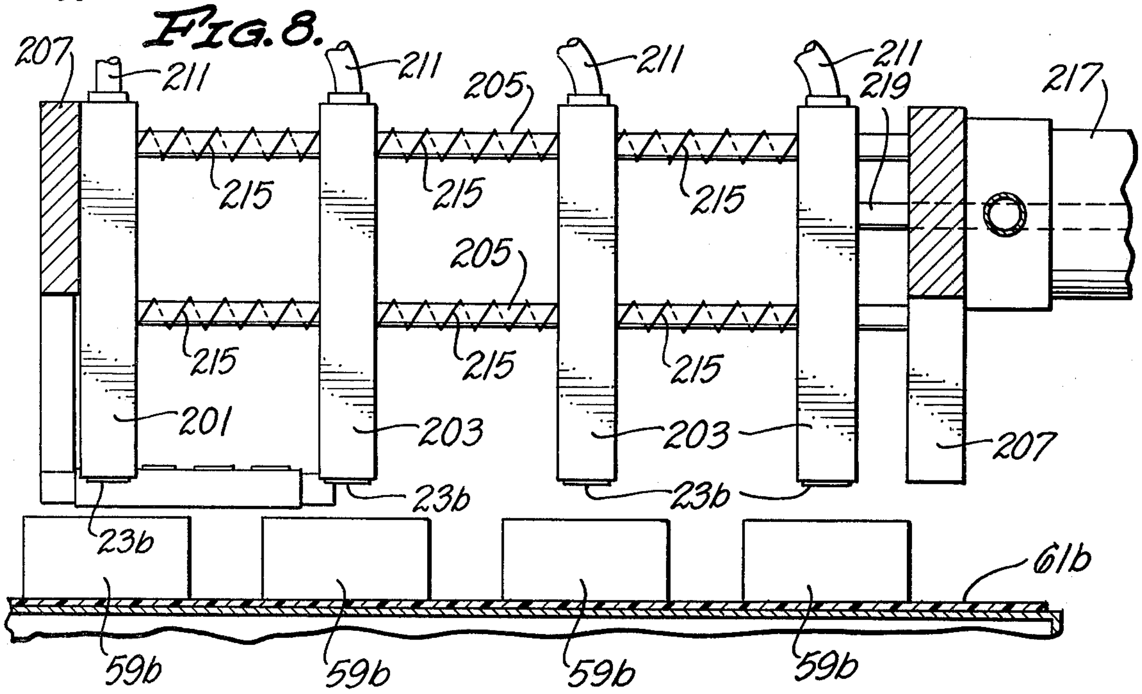
FIG. 8 is a view similar to FIG. 7 with the label receivers being at the label applying station.

FIGS. 7 and 8 show a label dispenser 11*b* in which certain portions corresponding to portions of the label applicator 11 are designated by corresponding reference numerals followed by the letter "b." A primary difference between the label applicator 11*b* and the label applicator 11 is that the latter only spreads the labels and does not move them in any other direction.

The applicator 11*b* includes label dispensing means 13*b* which is identical to the label dispensing means 13. The label applicator 11*b* in the embodiment illustrated utilizes a label strip which includes four longitudinally extending rows of labels 23*b*.

The label separating means 15*b* includes a stationary label receiver 201 and three movable label receivers 203. The label receivers 201 and 203 are mounted on supporting structure which includes a plurality of guide rows 205 which have their end portions fixedly mounted on fixed mounting plates 207 which form a portion of the supporting structure 17*b*.

Each of the label receivers 201 and 203 includes an air pervious, apertured grid 209 and a fitting 211 for providing sources of vacuum and positive air pressures. The label receiver 201 is suitably fixedly mounted on the rods 205 and it abuts one of the mounting plates 207. The movable label receivers 203 are mounted on the rods 205 for sliding movement therealong. Preferably, the rods 205 do not penetrate the portions of the label receivers 201 and 203 which are subjected to vacuum pressure and positive air pressure. Coil compression springs 215 are countersunk within the label receivers away from each other. An actuator 217 is mounted on the righthand mounting plate 207 and is coupled to drive the righthand label receiver 203 by means of a connecting rod 219.

With the actuator 217 extended as shown in FIG. 7, the rod 219 pushes the righthand label receiver 203 to the left to compress the spring 215 and hold all four of the label receivers at the label dispensing station in which the grids 209 are closely adjacent the peeling edge 27*b* of the peeling bar 25. The label dispensing means 13*b* then dispenses labels 23*b* onto the grids 209 as described more particularly in the embodiment of FIGS. 1–3.

After the labels 23*b* are dispensed onto the grids 209, the actuator 217 retracts to move the righthand label receiver 203 to the right to the position shown in FIG. 8. This allows the springs 215 to expand to move the other two movable label receivers 203 to the right to the position shown in FIG. 8. Thus, the three movable label receivers 203 move different distances along the same linear path which is parallel to the peeling edge 27 of the peeling bar 25. This path also extends transverse to the direction of movement of the labels 23*b* onto the grids 209. The stationary label receiver 201 remains in the same position and so this label receiver is in the same location for both the label dispensing station and the label applying station.

The spacing between the label receivers 201 and 203 corresponds, in the embodiment illustrated, to the center-to-center spacing of four articles 59*b* being conveyed through the label applying station by the conveyor 61*b*. The presence of the articles 59*b* at the label applying station is sensed in a conventional manner, and a blast of air is provided through each of the fittings 211 to remove simultaneously the labels 23*b* of the associated label receiver 201 and 203 and apply such labels to the article 59*b* immediately therebelow. The label receivers 201 and 203 can await the signal from the article sensor in either the position of FIG. 7 or the position of FIG. 8. Following label application and in response to the airblast, the actuator 217 is automatically extended to return the label applicator to the position shown in FIG. 7 whereupon the above-described cycle is repeated.

Although exemplary embodiments of the invention have been shown and described, many changes, modifications and substitutions may be made by one having ordinary skill in the art without necessarily departing from the spirit and scope of this invention.

We claim:

1. A label applicator for use with labels which are provided in a plurality of rows extending longitudinally on a backing strip, said label applicator comprising:

label dispensing means for peeling at least one label from each of at least two rows on the backing strip with the labels moving in a first direction off of the backing strip to provide at least first and second labels at a label dispensing station;

label separating means for receiving from the label dispensing means at the label dispensing station the first and second labels which have been peeled from the backing strip and separating the first and second labels in a direction generally transverse to said first direction to increase the distance between the first and second labels;

transferring means for transferring the first and second labels which have been separated by said label separating means to at least one article; and said label separating means including first and second label receivers for receiving the first and second labels, respectively, means for mounting said first label receiver, and means for mounting said second label receiver for movement relative to the first label receiver to effect separation of the first and second labels, and each of said label receivers including means for releasably retaining the labels supplied thereto.

2. A label applicator as defined in claim 1 wherein said label receivers receive the first and second labels with the first and second labels being generally in a first plane and separate the first and second labels in a direction generally transverse to said first direction and generally in the plane of the first and second labels to increase the distance between the first and second labels.

3. A label applicator for use with labels which are provided in a plurality of rows extending longitudinally on a backing strip, said label applicator comprising:

label dispensing means for peeling at least one label from each of at least two rows of the backing strip with the labels moving in a first direction off of the backing strip to provide at least first and second labels at a label dispensing station;

label separating means for receiving from the label dispensing means at the label dispensing station the first and second labels which have been peeled from the backing strip and separating the first and second labels in a direction generally transverse to said first direction to increase the distance between the first and second labels;

transferring means for transferring the first and second labels which have been separated by said label separating means to at least one article; and said label separating means including means for moving said first label along a first path from the label dispensing station to a label applying station and means for moving the second label along a second path from the label dispensing station to the label applying station, said first and second labels being farther apart at said label applying station than at said label dispensing station.

4. A label applicator as defined in claim 3 wherein said second path is inclined relative to said first path whereby the first and second labels are separated in moving from the label dispensing station to the label applying station.

5. A label applicator for use with labels which are provided in a plurality of rows extending longitudinally on a backing strip, said label applicator comprising:

label dispensing means for peeling at least one label from each of at least two rows on the backing strip with the labels moving in a first direction off of the backing strip to provide at least first and second labels at a label dispensing station;

label separating means for receiving from the label dispensing means at the label dispensing station the first and second labels which have been peeled from the backing strip and separating the first and second labels in a direction generally transverse to said first direction to increase the distance between the first and second labels;

transferring means for transferring the first and second labels which have been separated by said label separating means to at least one article; and said label separating means including a carriage, means for mounting the carriage for movement through said label dispensing station and a label applying station, first means on said carriage for receiving said first and second labels at said label dispensing station, means for retaining the first and second labels on said first means, the movement of said carriage carrying the first means from the label dispensing station to the label applying station, and said label separating means including means for separating said first and second labels as the carriage moves the first means from the label dispensing station to the label applying station.

6. A label applicator as defined in claim 5 wherein said mounting means mounts the carriage for rotation through said label dispensing station and said label applying station.

7. A label applicator as defined in claim 5 wherein said mounting means mounts the carriage for reciprocation along a path through said label dispensing station and said label applying station.

8. A label applicator for use with labels which are provided in a plurality of rows extending longitudinally on a backing strip wherein the backing strip has a longitudinal dimension and a width dimension, said label applicator comprising:

a label dispenser including means for moving the backing strip with the labels thereon and means responsive to movement of the backing strip at a label dispensing station for removing at least one label from each of at least two rows on the backing strip to provide at least first and second labels at the label dispensing station;

label separating means for receiving from the label dispenser at the label dispensing station the first and second labels which have been removed from the backing strip and separating the first and second labels generally in the direction of said width dimension at said label dispensing station to increase the distance between the first and second labels;

transferring means for transferring the first and second labels which have been separated by said label separating means to at least one article; and said label separating means including first and second label receivers for receiving the first and second labels, respectively, means for mounting said first label receiver, and means for mounting said second label receiver for movement relative to the first label receiver to effect separation of the first and second labels, and each of said label receivers including means for releasably retaining the labels supplied thereto.

9. A label applicator machine comprising:

a supporting structure;

first and second label receivers;

means for mounting said first label receiver and said second label receiver on the supporting structure for relative movement between a first position and a second position, said label receivers being closer together in said first position than in said second position;

each of said first and second label receivers including means for releasably retaining the labels supplied thereto on such label receiver;

means for relatively moving said first and second label receivers between said first position and second position; and means for transferring the labels on the first and second label receivers to at least one article.

10. A label applicator machine as defined in claim 9 wherein said transferring means is operable at least when the label receivers are in said second position to transfer the labels on the first and second label receivers to said one article and said label applicator includes label dispensing means for supplying labels to the first and second label receivers at least when the label receivers are in said first position.

11. A label applicator machine as defined in claim 9 wherein said mounting means mounts said first and second label receivers for movement along first and second paths, respectively, between said first and second positions, said first and second label receivers being adapted to receive the first and second labels, respectively, in the first position and said transferring means being operable at least when the first and second label receivers are in said second position.

12. A label applicator machine as defined in claim 11 wherein said first and second paths extend in substantially the same direction.

13. A label applicator machine as defined in claim 11 wherein said first and second paths diverge as they extend from the first position toward the second position.

14. A label applicator machine as defined in claim 9 wherein said mounting means includes a carriage, means for mounting said carriage on the supporting structure for movement along a first path, second means for mounting said first label receiver on said carriage, and third means for mounting said second label receiver on said carriage for movement relative to said first label receiver and relative to said carriage.

15. A label applicator machine as defined in claim 14 including means for moving said second label receiver relative to said first label receiver and relative to the carriage as a function of the position of said carriage along said first path.

16. A label applicator machine as defined in claim 15 wherein said carriage mounting means mounts the carriage on the supporting structure for movement in both directions along said first path, said second mounting means mounts the first label receiver on said carriage for movement relative to said second label receiver and relative to said carriage and said moving means moves the first and second label receivers relatively close together at one location along said first path to define said first position and moves said first and second label receivers away from each other as the carriage travels from said first location to a second location to place said label receivers in said second position at said second location.

17. A label applicator machine as defined in claim 15 wherein said carriage mounting means includes means for mounting the carriage for rotation about a rotational axis, said first position of said label receivers being at a first angular position of said carriage about its rotational axis and said second position being at a different angular position of said carriage about its rotational axis.

18. A label applicator machine as defined in claim 14 wherein said carriage includes a drum, said carriage mounting means includes means for mounting said drum for rotation about a rotational axis, said first position of said label receivers being at a first angular position of said drum about its rotational axis and said second position having at a different angular position of said drum about its rotational axis, said means for relatively moving said first and second label receivers includes a cam at least partially circumscribing said drum and having a cam surface which is inclined as it extends from said first position toward said second position.

19. A label applicator machine as defined in claim 9 wherein said means for relatively moving the first and second label receivers moves said second label receiver in both directions along a path which extends toward and away from said first label receiver.

* * * * *